United States Patent [19]

Szente

[11] 4,012,955
[45] Mar. 22, 1977

[54] APPARATUS FOR MEASURING THE INCIDENT POWER OF LIGHT IN FIBER OPTICS

[75] Inventor: Pedro Americo Szente, San Jose, Calif.

[73] Assignee: Hewlett-Packard Company, Palo Alto, Calif.

[22] Filed: Jan. 19, 1976

[21] Appl. No.: 650,404

[52] U.S. Cl. .......................................... 73/190 EW
[51] Int. Cl.² ........................................ G01K 17/00
[58] Field of Search .................. 73/190 EW, 355; 250/227

[56] References Cited

UNITED STATES PATENTS

| 2,357,193 | 8/1944 | Harrison | 73/355 X |
| 3,162,045 | 12/1964 | Kudelko | 73/355 |
| 3,487,213 | 12/1969 | Horan et al. | 73/355 X |
| 3,561,265 | 2/1971 | Schmidt | 73/190 |
| 3,684,996 | 8/1972 | Schwarz | 73/355 X |
| 3,739,182 | 6/1973 | Bickler | 250/227 X |
| 3,936,631 | 2/1976 | Muska | 250/227 |
| 3,939,706 | 2/1976 | Pinson | 73/190 |

FOREIGN PATENTS OR APPLICATIONS 696,255  8/1953  United Kingdom ............... 250/227

OTHER PUBLICATIONS

Farmer "Lusor Calorimeter for Three Orders of Energy Level" in Optics & Laser Technology 11/71 pp. 224–225.

Primary Examiner—Herbert Goldstein
Attorney, Agent, or Firm—Patrick J. Barrett

[57] ABSTRACT

A power measuring apparatus for measuring the incident power of light transmitted through a fiber optic light conductor comprises a first thermistor optically coupled to a fiber optic light conductor. The first thermistor forms one arm of a self-balancing resistance bridge. A second thermistor, physically close to the first thermistor but isolated from the light incident on the first thermistor, is connected to a second self-balancing bridge. The outputs of the self-balancing bridges are connected to metering circuitry which provides a measure of the incident power.

9 Claims, 10 Drawing Figures

4,012,955

APPARATUS FOR MEASURING THE INCIDENT POWER OF LIGHT IN FIBER OPTICS

BACKGROUND OF THE INVENTION

Fiber optic light conductors are finding increasing use in various kinds of data communication systems, since an optical signal can be confined to the fiber optic conductor and thereby isolated from external optical interference. In designing and servicing such optical communication systems, it is frequently necessary to know the power of the signal being transmitted on the fiber optic light conductor in order to measure such parameters as system gain or attenuation. Prior art optical measuring instruments usually measure only radiant flux, that is, the power passing through some unit area. An example of a prior art radiant flux measuring instrument is shown in an article entitled "Optical Power Measurements Made Easy" by C. L. Hicks and M. R. Mellon in the Hewlett-Packard Journal, July, 1971, pages 10–16. While such measurements are useful in some optical applications they are not particularly well suited to providing desirable information about the power transmitted in a fiber optic cable since it is usually desirable to know the absolute value of the total power transmitted by the fiber optic cable.

SUMMARY OF THE INVENTION

According to the preferred embodiment of the present invention, the absolute value of the total power passing through a fiber optic light conductor is measured by optically connecting the fiber optic light conductor to a measurement thermistor which absorbs substantially all of the incident light. The measurement thermistor forms one arm of a self-balancing resistance bridge that maintains the measurement thermistor at a constant temperature. When light is absorbed by the measurement thermistor, the temperature of the thermistor increases and in response the bridge balance is adjusted to reduce the amount of current passing through the measurement thermistor, thus decreasing its temperature to maintain it in a quiescent state. A reference thermistor is placed near the measurement thermistor to measure the ambient temperature and provide a correction signal for changes in ambient temperature. This correction signal is provided through a similar self-balancing bridge. Both thermistors are enclosed in a thermally insulated package with a connector for connecting one of the sensors to a fiber optic cable carrying a signal to be measured.

DESCRIPTION OF THE PREFERRED EMBODIMENT

Figure 1:
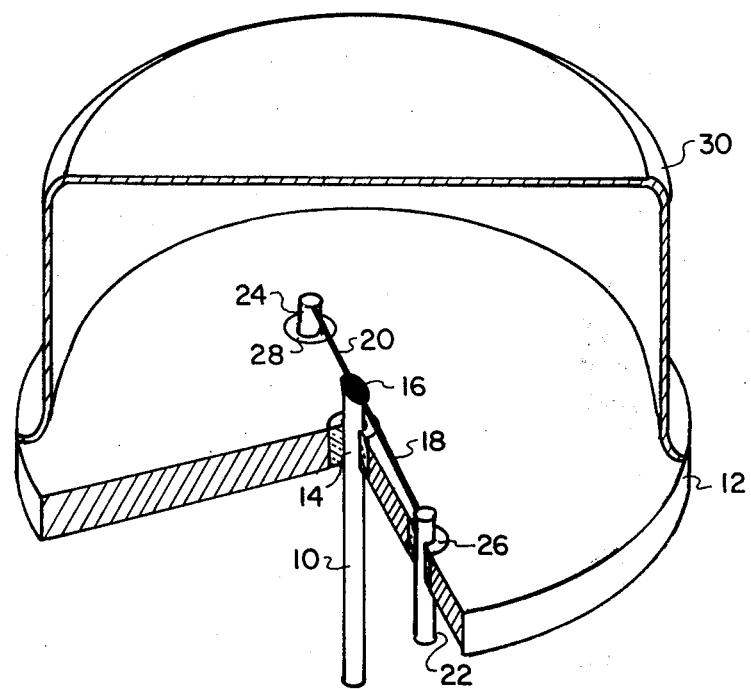
FIG. 1 shows a sectional perspective view of one embodiment of the present invention.

FIG. 1 shows a cutaway of a power sensor for light transmitted via a fiber optic light conductor 10. The fiber optic light conductor is mounted in a base 12 using a thermal insulator 14 which preferably has a lower index of refraction than the fiber optic light conductor 10, so that light passing through the light conductor is not diverted into insulator 14. Fastened to the end of light conductor 10 is a thermistor 16 having leads 18 and 20. Leads 18 and 20 are electrically connected to terminals 22 and 24 respectively which are mounted in base 12 by insulators 26 and 28 respectively. Preferably leads 18 and 20 have a relatively small cross-sectional area to minimize heat flow through them. A cover 30 is also attached to base 12 to isolate the thermistor from air currents and protect it from damage. The enclosure formed by cover 30 and base 12 may be evacuated to increase sensitivity and to reduce the thermal effects of convection currents within the enclosure.

Figure 2:
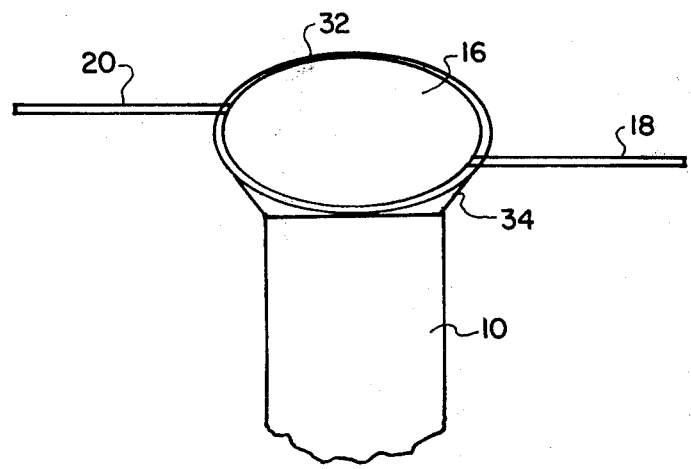
FIG. 2 shows a thermistor bead attached to the end of a fiber optic light conductor.

FIG. 2 shows an enlarged view of thermistor 16 attached to light conductor 10. The thermistor material is selected so that the surface is optically absorptive and reflects a minimal amount of light. Typically the thermistor material is encased in a protective glass sheath 32 which is transparent to light. An example of such a thermistor is the VECO Model 32A503 thermistor which has a nominal value of about 100 ohms at 137° C. The thermistor is attached to the light conductor by a bonding material 34 which is also optically transparent and, if the thermistor has a protective glass coating, the index of the refraction of bonding material 34 should be the geometric means of the indices of refraction of glass layer 32 and light conductor 10. If there is no protective glass sheath on the thermistor material or if the outer surface of the thermistor bead is a good light absorber, the index of refraction of bonding material 34 should be equal to that of the light conductor 10 in order to prevent the reflection of light from the bonding material. The thermistor should also be slightly larger than the cross-sectional area of the end of light conductor 10 to help ensure that all of the light coming through the light conductor is absorbed by the thermistor.

Figure 3:
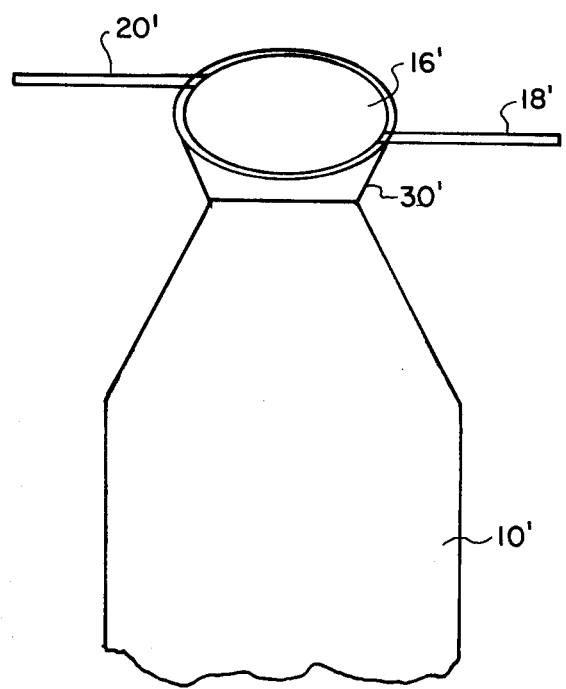
FIG. 3 shows a modified version of the device shown in FIG. 2.

FIG. 3 shows a thermistor 16' attached to the end of a relatively large light conductor 10'. The end of light conductor 10' has been tapered so that the cross-sectional area of the end of the light conductor will be slightly less than the size of the thermistor. The angle of the taper is also chosen to be small enough so that light does not escape through the surface of the tapered portion of the light conductor.

Figure 4A:
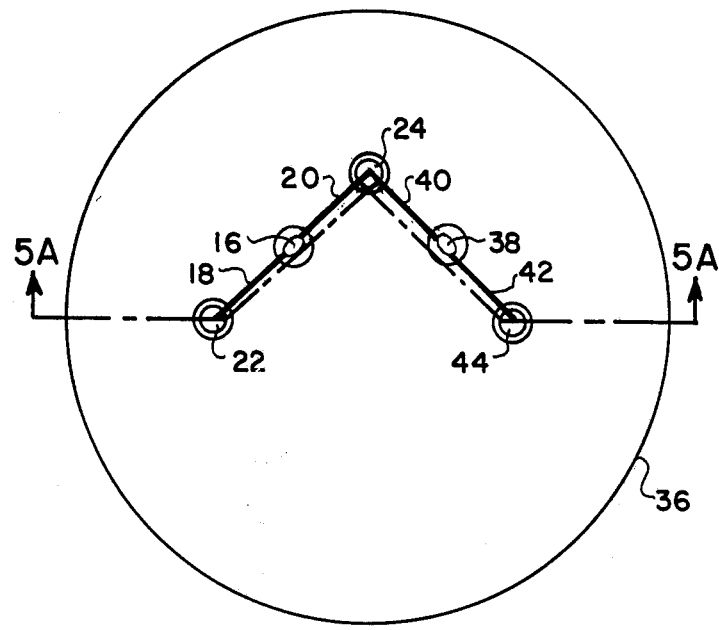
FIGS. 4A and B show plan views of embodiments of the present invention.

FIG. 4A shows a base 36 having two thermistors 16 and 38. Thermistor 16, as described above, is attached to a light conductor 10 and has leads 18 and 20 attached to terminals 22 and 24 respectively. A similar thermistor 38 has leads 40 and 42, with lead 40 also attached to terminal 24 and lead 42 attached to terminal 44. Thermistor 38 is used as a reference thermistor to measure the ambient temperature in the vicinity of thermistor 16 to provide for temperature compensation.

Figure 5A:
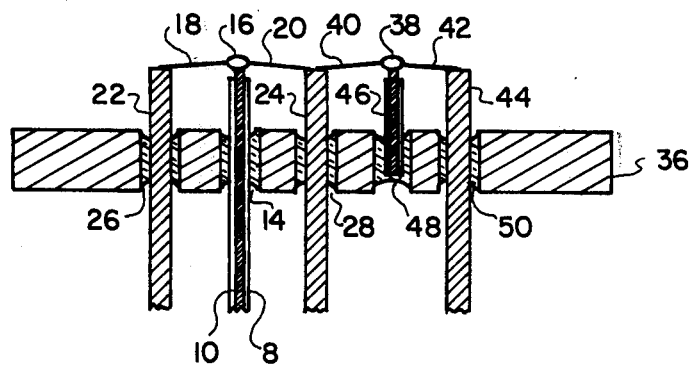
FIGS. 5A, B and C show sectional views of FIGS. 4A and B.

FIG. 5A shows a sectional view of FIG. 4A to illustrate how terminals 22, 24 and 44 as well as fiber optic light conductor 10 are held in base 36 by their respective insulators 26, 28, 50 and 14. Insulators 26, 28 and 50 should, of course, be good electrical insulators and may be the typical glass bead, hermetic seals used in standard metal can transistor packages. Insulator 14 should be a good thermal insulator and, as mentioned before, should have a lower index of refraction than the fiber optic light conductor so that light does not leak out of the light conductor into the insulator. Fiber optic light conductor 10 can also be a sheathed optical fiber with an opaque sheath 8 to protect and insulate the fiber.

To make sure that thermal conditions for thermistor 38 are as nearly the same as the thermal conditions for thermistor 16, thermistor 38 is also mounted on a section of a fiber optic light conductor 46. This fiber optic light conductor is fastened in base 36 by an insulator 48 which is the same as insulator 14. Light conductor 46, however, does not extend all the way through base 36 but is cut off and the end is suitably treated, such as by paining it black, so that no light passes through it. Thus, thermistor 38 is always dark compared with thermistor 16 and the only environmental difference between the two should be the light input to thermistor 16.

Figure 4B:
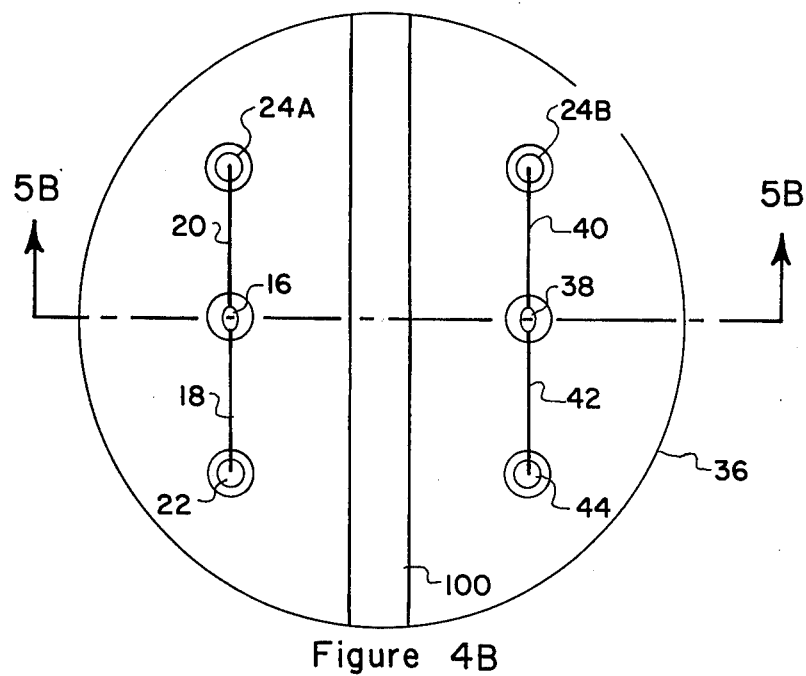
Figure 5B:
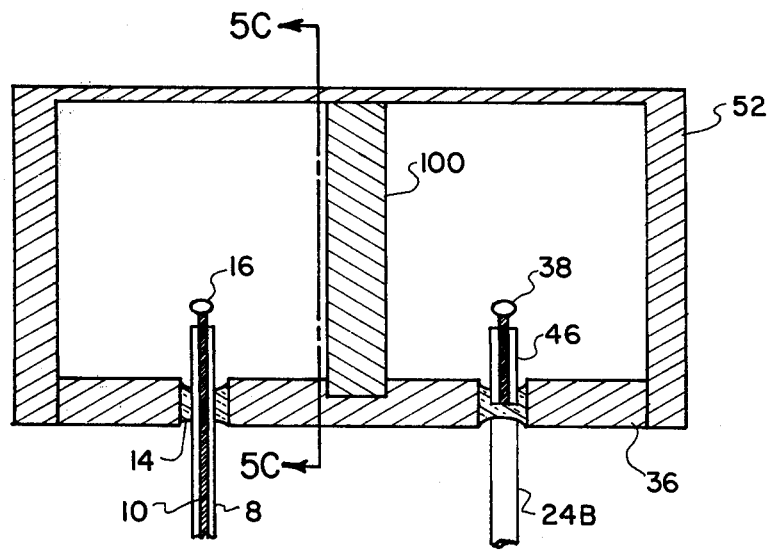
Figure 5C:
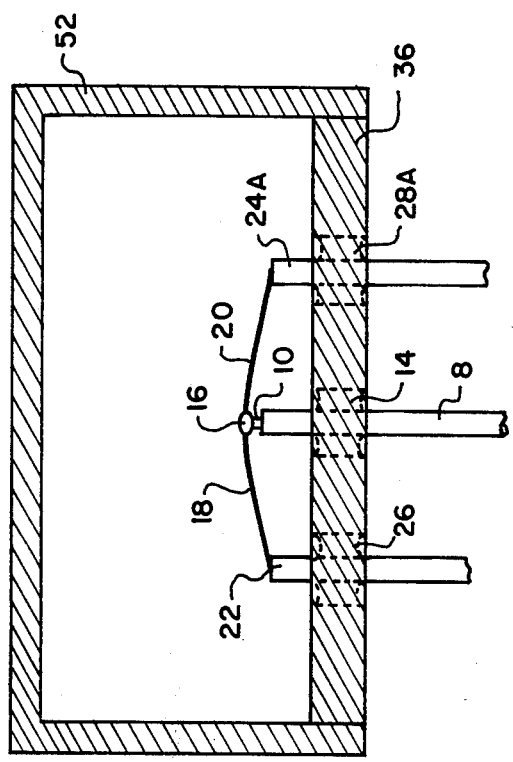

In order to reduce further undesired disturbances to the thermal environment of thermistors 16 and 38, they may be physically isolated from one another. Means for such isolation are shown in the alternative embodiment of the power sensor in FIGS. 4B, 5B, and 5C where like components are labeled with the same reference designators are used in FIGS. 4A and 5A. A metal septum 100 may be used to separate the two thermistors to minimize the effect on one thermistor of convection currents caused by the other thermistor. In order to facilitate the separation of the two thermistors by septum 100, terminal 24 shown in FIG. 4A is divided into two terminals 24A and 24B as shown in FIG. 4B. The septum may be fastened between base 36 and a cover 52 on the base.

Each of the thermistors 16 and 38 can be used to form one arm of a self-balancing bridge such as the self-balancing bridges described in U.S. Pat. No. 3,626,290 granted to Edward E. Aslan, Dec. 7, 1971, and U.S. Pat. No. 3,501,696 granted Mar. 17, 1970 to Russell B. Riley, which patents are herein incorporated by reference. In each self-balancing bridge a current passes through each of the branches of the bridge, and thus through each thermistor, to maintain the bridge in a balanced condition. The current passing through each of the thermistors maintains each thermistor at a given quiescent temperature, such as 137° C in the preferred embodiment. When light is incident on thermistor 16, the temperature of the thermistor will start to rise because of the additional power. The rise in temperature of the thermistor will decrease its resistance and unbalance the bridge. The unbalance in the bridge will be detected by an amplifier connected across the bridge which, in response to this change, will reduce the amount of current supplied to the bridge thus lowering the current through the thermistor. The self-heating of the thermistor due to the current passing through it will in turn be reduced, returning the thermistor to its quiescent temperature. Thus the thermistor is always maintained at the same temperature and the amount by which the current through the thermistor was reduced is a direct measure of the optical power absorbed by the thermistor. Thus, the output of the self-balancing bridge can be displayed on a meter to give a direct, absolute measurement of the number of watts of power incident upon the thermistor.

Since thermistor 16 is also sensitive to ambient temperature changes, a second self-balancing bridge having thermistor 38 in one of its arms is provided to supply a temperature compensating signal so that temperature effects can be subtracted out of the final result displayed on the metering circuitry. Such a compensation scheme is more thoroughly described in the above-mentioned Riley patent.

Figure 6:
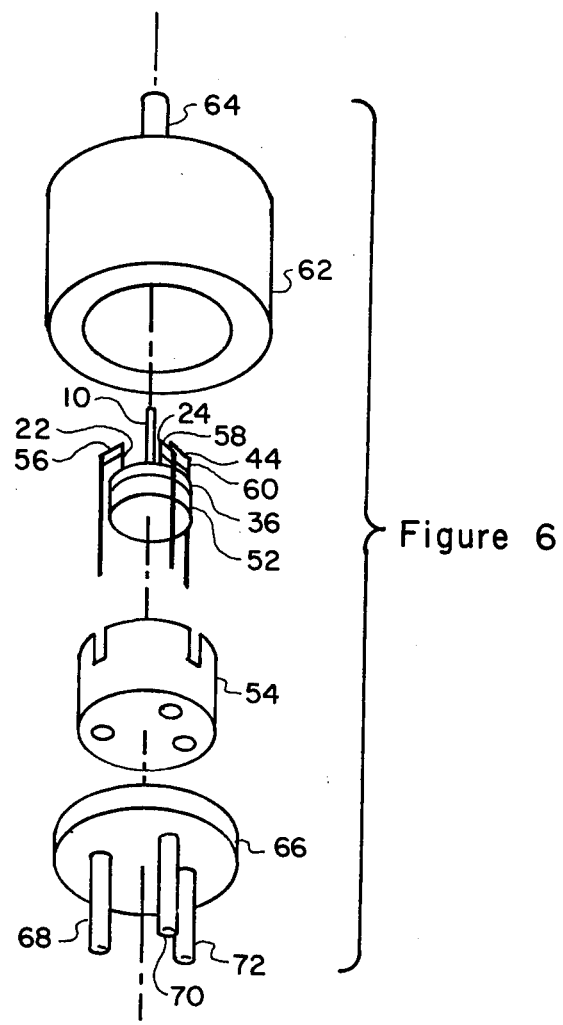
FIG. 6 shows an exploded view of the preferred embodiment of the present invention.

To further isolate the power sensor from transient thermal effects, a sensor package is provided as shown in FIG. 6. Cover 52, similar to cover 30 on base 12, is placed on base 36 to provide an enclosure around thermistors 16 and 38. This assembly forms a housing which may, in turn, be placed in a metal heat sink 54 made out of aluminum, for example, to provide a large thermal capacitor which buffers thermal changes in the external atmosphere. Terminals 22, 24 and 44 are attached to large metallic tabs 56, 58 and 60 respectively and these tabs are electrically insulated but thermally coupled to heat sink 54 to maintain terminals 22, 24 and 44 at a relatively constant temperature. Heat sink 54 is, in turn, placed in a thermally insulating housing 62 which has a fiber optic cable connector 64 at one end for receiving fiber optic light conductor 10. At the other end of housing 62 is a thermally and electrically insulating cap 66 having connector pins 68, 70 and 72 which connect respectively to terminals 22, 24 and 44.

Figure 7:
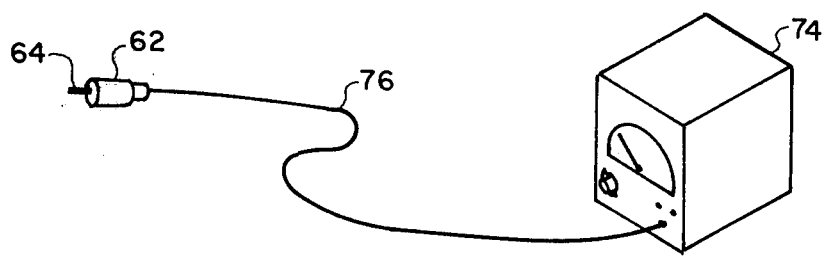
FIG. 7 shows a schematic illustration of a power measuring instrument including a sensor and metering circuitry.

As illustrated schematically in FIG. 7, connector pins 68, 70 and 72 can be connected to metering circuitry 74, such as the circuitry illustrated in the Riley, et al., patent, by a cable 76.

I claim:

1. An apparatus for measuring the incident power of light from a fiber optic light conductor comprising:
   a first fiber optic light conductor for receiving light;
   a measurement thermistor which has first and second electrical leads and which is bonded to an end of the first fiber optic light conductor with an optically transparent bonding agent;
   a second fiber optic light conductor which receives no light;
   a reference thermistor which has first and second electrical leads and which is bonded to an end of the second fiber optic light conductor; and
   electrical connection means for providing electrical connection to the measurement and reference thermistors and adapted to be connected to metering apparatus to provide an indication of the incident power of the light transmitted through the first fiber optic light conductor to the measurement thermistor, the electrical connection means including electrically conductive terminals to which the first and second leads of the measurement and reference thermistors are attached.

2. An apparatus as in claim 1 further comprising a housing enclosing the measurement thermistor and the reference thermistor and attached to the electrical connection means.

3. An apparatus as in claim 2 further comprising:
   a septum supported within the housing for separating the measurement thermistor and the reference thermistor.

4. An apparatus as in claim 2 wherein the housing includes a base with feed-through insulators for supporting and electrically insulating each of the electrically conductive terminals, with a feed-through insulator for supporting and thermally isolating the first fiber optic light conductor, and with a mounting insulator for supporting and thermally isolating the second fiber optic light conductor.

5. An apparatus as in claim 4 further comprising optical connection means attached to the first fiber optic light conductor for receiving light from a fiber optic cable.

6. An apparatus as in claim 4 further comprising metering apparatus connected to the electrical connection means for measuring the resistance of the measurement thermistor.

7. An apparatus as in claim 6 wherein the metering apparatus comprises a test self-balancing bridge and a reference self-balancing bridge, one arm of the test self-balancing bridge including the measurement thermistor and one arm of the reference self-balancing bridge including the reference thermistor.

8. An apparatus as in claim 4 including a heat sink member thermally coupled to, but electrically insulated from, the housing and the electrically conductive terminals and thermally insulated from the first fiber optic light conductor.

9. An apparatus as in claim 1 wherein the measurement thermistor is at least as large as the cross section of the first fiber optic light conductor at the point where the measurement thermistor is bonded thereto.

* * * * *